US011403940B2

(12) United States Patent
Uçar et al.

(10) Patent No.: US 11,403,940 B2
(45) Date of Patent: Aug. 2, 2022

(54) METHODS AND SYSTEMS FOR INSTALLING A STRUCTURE USING MOVEABLE OBJECTS

(71) Applicant: Toyota Motor Engineering & Manufacturing North America, Inc., Plano, TX (US)

(72) Inventors: Seyhan Uçar, Mountain View, CA (US); Baik Hoh, Campbell, CA (US); Kentaro Oguchi, Sunnyvale, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 193 days.

(21) Appl. No.: 16/735,804

(22) Filed: Jan. 7, 2020

(65) Prior Publication Data

US 2021/0209943 A1    Jul. 8, 2021

(51) Int. Cl.
*G08G 1/07* (2006.01)
*H04L 67/12* (2022.01)
(Continued)

(52) U.S. Cl.
CPC .............. *G08G 1/07* (2013.01); *E01F 13/02* (2013.01); *E01F 13/04* (2013.01); *G05D 1/0276* (2013.01);
(Continued)

(58) Field of Classification Search
CPC .... G08G 1/07; G08G 1/005; G08G 1/096725; E01F 13/02; E01F 13/04; G05D 1/0276; G05D 2201/0202; H04L 67/12
See application file for complete search history.

(56) References Cited

U.S. PATENT DOCUMENTS 9,624,630 B1    4/2017 Maus et al.
10,113,279 B2   10/2018 Stevens et al.
(Continued)

FOREIGN PATENT DOCUMENTS

CN    203295992 U  * 11/2013
CN    107964900 A    4/2018
(Continued)

OTHER PUBLICATIONS

ADA National Network, A Planning Guide for Making Temporary Events Accessible to People with Disabilities (2015), available at: https://adata.org/sites/adata.org/files/files/EventPlanningGuide_Final_2015.pdf (Year: 2015).*
(Continued)

*Primary Examiner* — Maceeh Anwari
*Assistant Examiner* — Charles Pall
(74) *Attorney, Agent, or Firm* — Dinsmore & Shohl LLP

(57) ABSTRACT

A system for installing a structure is provided. The system includes a plurality of moveable objects, and a server including a controller including one or more processors, and machine readable instructions stored in one or more memory modules that, when executed by the one or more processors, cause the controller to: communicate with the plurality of moveable objects; receive a request for installing the structure at a location; select a group of moveable objects among the plurality of moveable objects based on locations of the plurality of moveable objects; instruct the group of moveable objects to move to the location; and instruct one or more of the group of moveable objects to morph at the location based on information about the structure.

20 Claims, 13 Drawing Sheets

(51) Int. Cl.
 *G08G 1/005* (2006.01)
 *E01F 13/02* (2006.01)
 *E01F 13/04* (2006.01)
 *G05D 1/02* (2020.01)
 *G08G 1/0967* (2006.01)

(52) U.S. Cl.
 CPC ............ *G08G 1/005* (2013.01); *H04L 67/12* (2013.01); *G05D 2201/0202* (2013.01); *G08G 1/096725* (2013.01)

(56) References Cited

U.S. PATENT DOCUMENTS

| | | | |
|---|---|---|---|
| 2012/0173045 A1* | 7/2012 | Conroy | F41H 5/06 701/2 |
| 2015/0071748 A1* | 3/2015 | Dyke | E01F 15/088 414/495 |
| 2018/0348763 A1* | 12/2018 | Jiang | G06N 5/046 |
| 2019/0106850 A1* | 4/2019 | Fiordi | A01G 9/02 |

FOREIGN PATENT DOCUMENTS

| | | | | |
|---|---|---|---|---|
| DE | 29705930 U1 | * | 10/1997 | ............... E01F 7/00 |
| GN | 109137795 A | | 1/2019 | |
| KR | 101776167 B1 | | 9/2017 | |
| KR | 20180091567 A | * | 8/2018 | ............. E01F 9/696 |
| KR | 101935575 B1 | | 1/2019 | |
| WO | WO-2016210451 A1 | * | 12/2016 | ............. E01F 9/696 |
| WO | 2019090785 A1 | | 5/2019 | |

OTHER PUBLICATIONS

Greg Hamm, "Protecting Pedestrians With Vehicle Barriers And Fences," Magazine Article, 2019 Show Coverage Presented By: NAPCO, URL: https://www.campussafetymagazine.com/university/pedestrians-vehicle-barriersfences/, Aug. 5, 2019.

\* cited by examiner

METHODS AND SYSTEMS FOR INSTALLING A STRUCTURE USING MOVEABLE OBJECTS

TECHNICAL FIELD

The present specification relates to systems and methods for installing a structure at a location, and more particularly, to systems and methods for installing a temporary structure using a plurality of moveable objects that guide pedestrians.

BACKGROUND

Existing corridors exist to facilitate the transfer of items, goods and/or people into and out of regions. However, significant drawbacks of existing corridors include the high cost of construction and maintenance on stationary properties.

Accordingly, a need exists for providing a method and system for installing a structure, such as a corridor in an on-demand basis.

SUMMARY

The present disclosure provides systems and methods for installing a structure on an on-demand basis. Specifically, the present system includes a plurality of moveable objects that have morphing properties to construct a requested structure, such as a humanitarian corridor, in an on-demand basis whenever or wherever the structure is needed. The present system provides remote and manual control through a management console and has data and traffic driven intelligence for curating the best locations for installing structures. The present system has dynamic morphing maneuver capability to form a demanded structure on roads.

In one embodiment, a system for installing a structure is provided. The system includes a plurality of moveable objects, and a server including a controller including one or more processors, and machine readable instructions stored in one or more memory modules that, when executed by the one or more processors, cause the controller to: communicate with the plurality of moveable objects; receive a request for installing the structure at a location; select a group of moveable objects among the plurality of moveable objects based on locations of the plurality of moveable objects; instruct the group of moveable objects to move to the location; and instruct one or more of the group of moveable objects to morph at the location based on information about the structure.

In another embodiment, a system for installing a structure is provided. The system includes a plurality of moveable objects, and a server includes a controller including one or more processors, and machine readable instructions stored in one or more memory modules that, when executed by the one or more processors, cause the controller to: communicate with the plurality of moveable objects; receive a request for enclosing an area at a location; select a group of moveable objects among the plurality of moveable objects based on locations of the plurality of moveable objects; instruct the group of moveable objects to move to the location; instruct the group of moveable objects to form the structure constituting a boundary of the area; and instruct the group of moveable objects to move and reconfigure the boundary of the area.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include systems and methods for installing a structure using a plurality of moveable objects on an on-demand basis. Referring to FIGS. 1A through 1C and 2, the present system includes a plurality of moveable objects 110, 112, 114, 120, 122, 124, and a server 104 including a controller including one or more processors, and machine readable instructions stored in one or more memory modules. The controller communicates with the plurality of moveable objects 110, 112, 114, 120, 122, 124, receives a request for installing the structure 150 at a location, selects a group of moveable objects 114 and 120 among the plurality of moveable objects based on locations of the plurality of moveable objects, instructs the group of moveable objects 114 and 120 to move to the location, and instructs one or more of the group of moveable objects 114 and 120 to morph at the location based on information about the structure to constitute the structure 150.

Each of the moveable objects may be an autonomous entity that creates flexible and intelligent spaces and high-quality experiences to eliminate barriers to the growth of communities and businesses of tomorrow. The present system provides remote and manual control through a management console and has data and traffic driven intelligence for curating the best locations. The present system has dynamic morphing maneuver capability to form a demanded structure on roads. According to the present disclosure, a structure, such as a humanitarian corridor, may be installed on an on-demand basis whenever or wherever it is needed. In contrast with conventional humanitarian corridors, according to the present disclosure, wherever or whenever a structure is requested, the location, corridor type and service start or end time are uploaded to the system. The system may utilize this information to build the requested structure at the requested location at the right time.

Figure 1A:
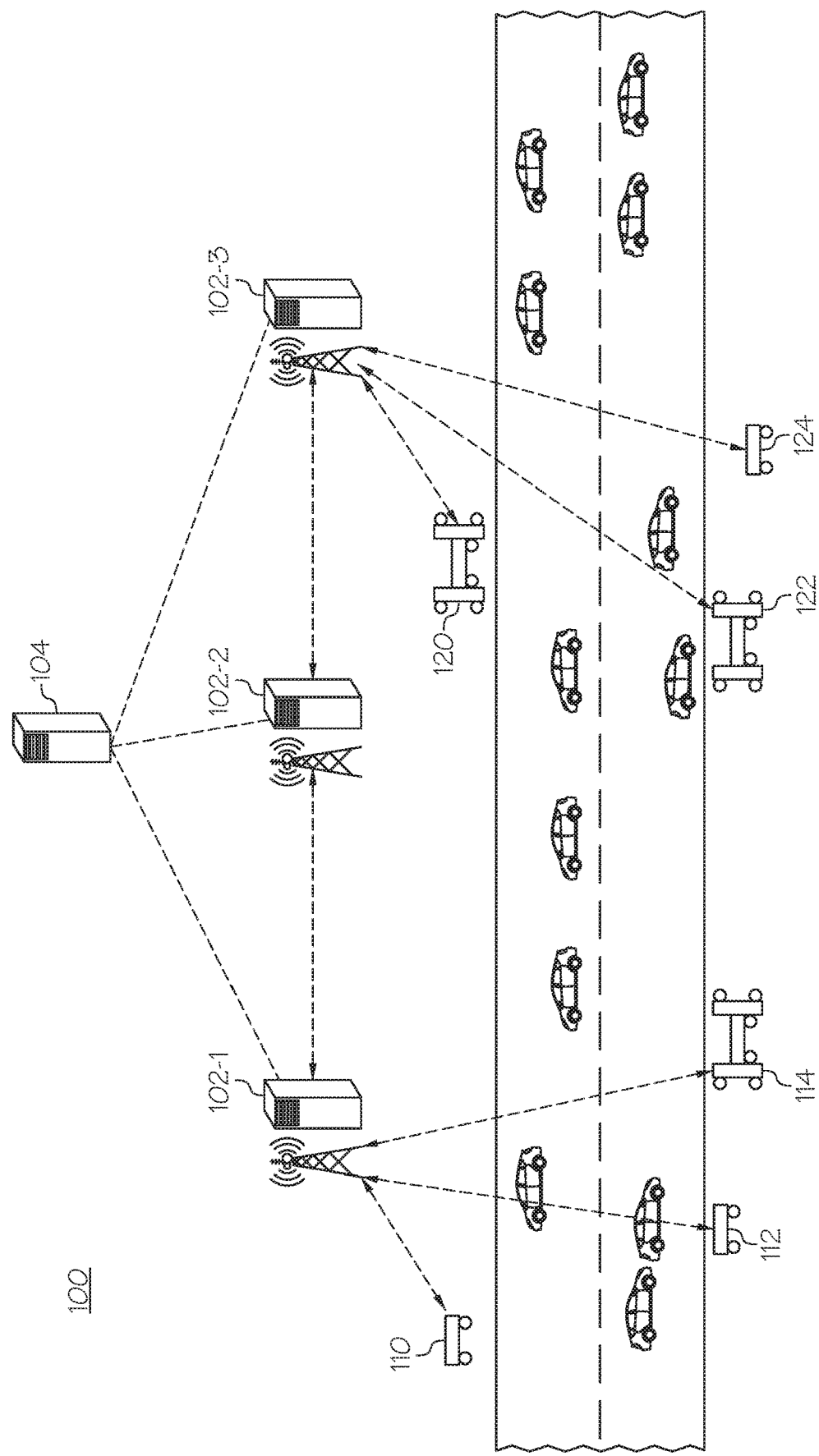
FIG. 1A schematically depicts a system for installing a structure, according to one or more embodiments shown and described herein.

FIG. 1A schematically depicts a system for installing a structure, according to one or more embodiments shown and described herein. In embodiments, a system 100 includes a plurality of servers 102-1, 102-2, 102-3, a remote server 104, and a plurality of moveable objects 110, 112, 114, 120, 122, 124. Each of the plurality of servers 102-1, 102-2, 102-3 may be a local server including, but not limited to, a roadside unit, an edge server, and the like. While FIG. 1A depicts three local servers, the present system may include less than or more than three local servers.

Each of the moveable objects 110, 112, 114, 120, 122, 124 may be a vehicle including an automobile or any other passenger or non-passenger vehicle such as, for example, a terrestrial, aquatic, and/or airborne vehicle. In some embodiment, one or more of the moveable objects 110, 112, 114, 120, 122, 124 may be an unmanned aerial vehicle (UAV), commonly known as a drone.

Each of the moveable objects 110, 112, 114, 120, 122, 124 may be an autonomous and connected vehicle that navigates its environment with limited human input or without human input. Each of the moveable objects 110, 112, 114, 120, 122, 124 may be equipped with internet access and share data with other devices both inside and outside the moveable objects. Each of the moveable objects 110, 112, 114, 120, 122, 124 may communicate with corresponding servers 102-1, 102-2, 102-3, respectively. Each of the servers 102-1, 102-2, 102-3 may communicate with moveable objects in an area covered by each of the servers 102-1, 102-2, 102-3. The servers 102-1, 102-2, 102-3 may communicate with other servers that cover different areas. The servers 102-1, 102-2, 102-3 may communicate with the remote server 104 and transmit information collected by the servers 102-1, 102-2, 102-3 to the remote server 104.

In embodiments, each of the moveable objects 110, 112, 124 may consist of a single moveable element while each of the moveable objects 114, 120, 122 consist of a plurality of moveable elements. The moveable element is a unit of a vehicle that may autonomously drive. Each of the moveable element contains a flexible and intelligent space. The moveable objects 110, 112, 124 may be box-shaped vehicles. For example, each of the movable objects 110, 112, 124 may have a rectangular parallelepiped body and a plurality of wheels. Each of the moveable objects 110, 112, 124 may have a space inside the body where people can ride. Moveable objects or moveable elements may have the same dimension or different dimensions.

Figure 1B:
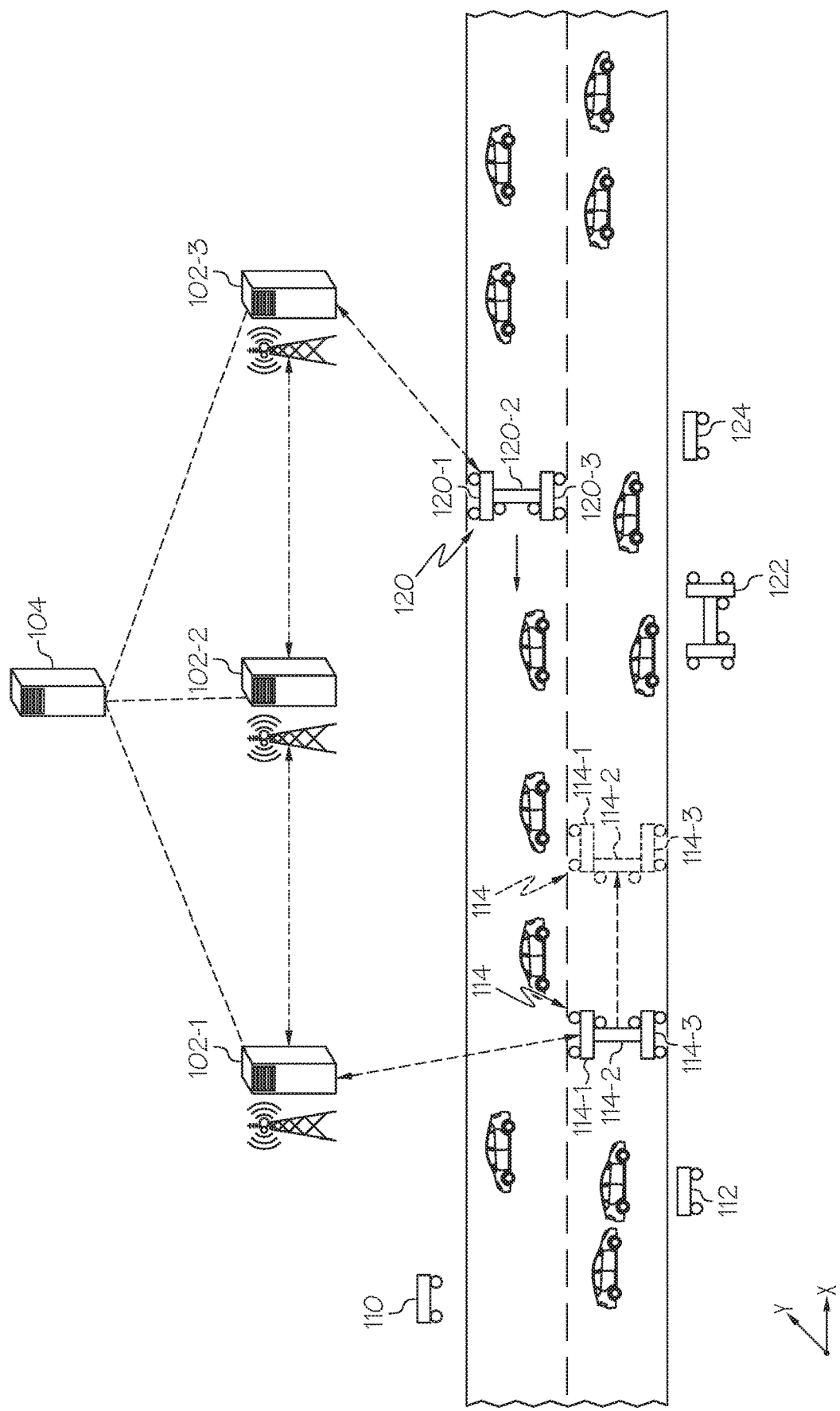
FIG. 1B schematically depicts a system for selecting and moving one or more moving objects for installing a structure, according to one or more embodiments shown and described herein.

The moveable objects 114, 120, 122 are compound moveable objects each of which includes a plurality of moveable elements. For example, as shown in FIG. 1B, the compound moveable object 114 includes three moveable elements 114-1, 114-2, 114-3. Each of the moveable elements 114-1, 114-2, 114-3 may have a structure comparable to the moveable objects 110, 112, 124. The moveable elements 114-1, 114-2, 114-3 are coupled to each other using any mechanical mechanism. For example, one end of the moveable element 114-2 may be plugged into a receiver of the moveable element 114-1 and the other end of the element 114-2 may be plugged into a receiver of the moveable element 114-3. Dimension information about the moveable objects 110, 112, 114, 120, 122, 124 may be stored in the servers 102-1, 102-2, 102-3 or in the remote server 104. The moveable objects 110, 112, 114, 120, 122, 124 may be parked outside of a road, e.g., at a parking lot, or parked at the side of the road. The moveable objects 110, 112, 114, 120, 122, 124 may communicate their locations to the servers, for example, the servers 102-1, 102-2, 102-3. The moveable objects 110, 112, 114, 120, 122, 124 may initiate moving to a designated location when they receive instructions from the local server 102-1, 102-2, or 102-3 or the remote server 104. In some embodiments, the moveable objects 110, 112, 114, 120, 122, 124 may constantly move on the road and communicate their locations to servers proximate to the moveable objects 110, 112, 114, 120, 122, 124.

FIG. 1B schematically depicts a system for selecting and moving one or more moving objects for installing a structure, according to one or more embodiments shown and described herein. In embodiments, the remote server 104 may receive a request for installing a structure. For example, a user may transmit a request for installing a structure to the remote server 104 using his computer or mobile phone. The request may include a location where the structure is to be installed, a type of the structure, and a service start time and end time for the structure. The structure may be any structure that can be installed on the road, for example, a corridor for people to cross a street in a school zone, or for a vehicle pass in a construction zone. In response to receiving the request, the remote server 104 may select a group of movable objects based on the information about the structure. For example, the structure may be a temporary corridor for people to cross a street. The remote server 104 or any of the servers 102-1, 102-2, 102-3 may determine that the temporary corridor may require six units of moveable elements. Then, the remote server 104 may select a group of moveable objects that include six moveable elements based on the information about the structure and information about the moveable objects. In this example, the remote server 104 may select the moveable object 114 and the moveable object 120. Each of the moveable objects 114 and 120 consists of three moveable elements. In embodiments, the remote server 104 may select the moveable object 114 and the moveable object 120 based the locations of the moveable object 114 and the moveable object 120. Specifically, the remote server 104 may select moveable objects that require the least traveling distance to the location of the structure to be installed. In some embodiments, the servers 102-1, 102-2, 102-3 may select a group of moveable objects based on information about the structure received from the remote server 104.

In some embodiments, the remote server 104 may instruct the moveable objects 114 and 120 to move to the location of the structure to be installed based on service start time and end time for the structure. For example, the service start time for the structure may be 3:30 pm and the end time for the structure may be 3:50 pm. Then, the remote server 104 or the combination of the servers 102-1, 102-2, 102-3 may instruct the moveable objects 114 and 120 to move toward the location of the structure to be installed prior to the service start time. Specifically, if the estimated time of arrival of the moveable object 114 at the location of the structure to be installed is 6 minutes, and the estimated time of arrival of the moveable object 120 at the location of the structure to be installed is 3 minutes, the server 102-1 may instruct the moveable object 114 to start moving toward the location of the structure to be installed at 3:24 pm, and the server 102-3 may instruct the moveable object 120 to start moving toward the location of the structure to be installed at 3:27 pm.

In some embodiments, the compound moveable objects 114 and 120 may morph while moving to the location of the structure to be installed. For example, as shown in FIG. 1B, while the compound moveable object 114 is moving toward the location of the structure to be installed, the moveable element 114-2 may be disengaged from the moveable elements 114-1 and 114-3 and move in the −x direction relative to the moveable elements 114-1 and 114-3. Similarly, while the compound moveable object 120 is moving toward the location of the structure to be installed, the moveable element 120-2 may be disengaged from the moveable elements 120-1 and 120-3 and move in the +x direction relative to the moveable elements 120-1 and 120-3. In some embodiments, the compound moveable objects 114 and 120 may morph after they arrive at the location where the structure to be installed.

Figure 1C:
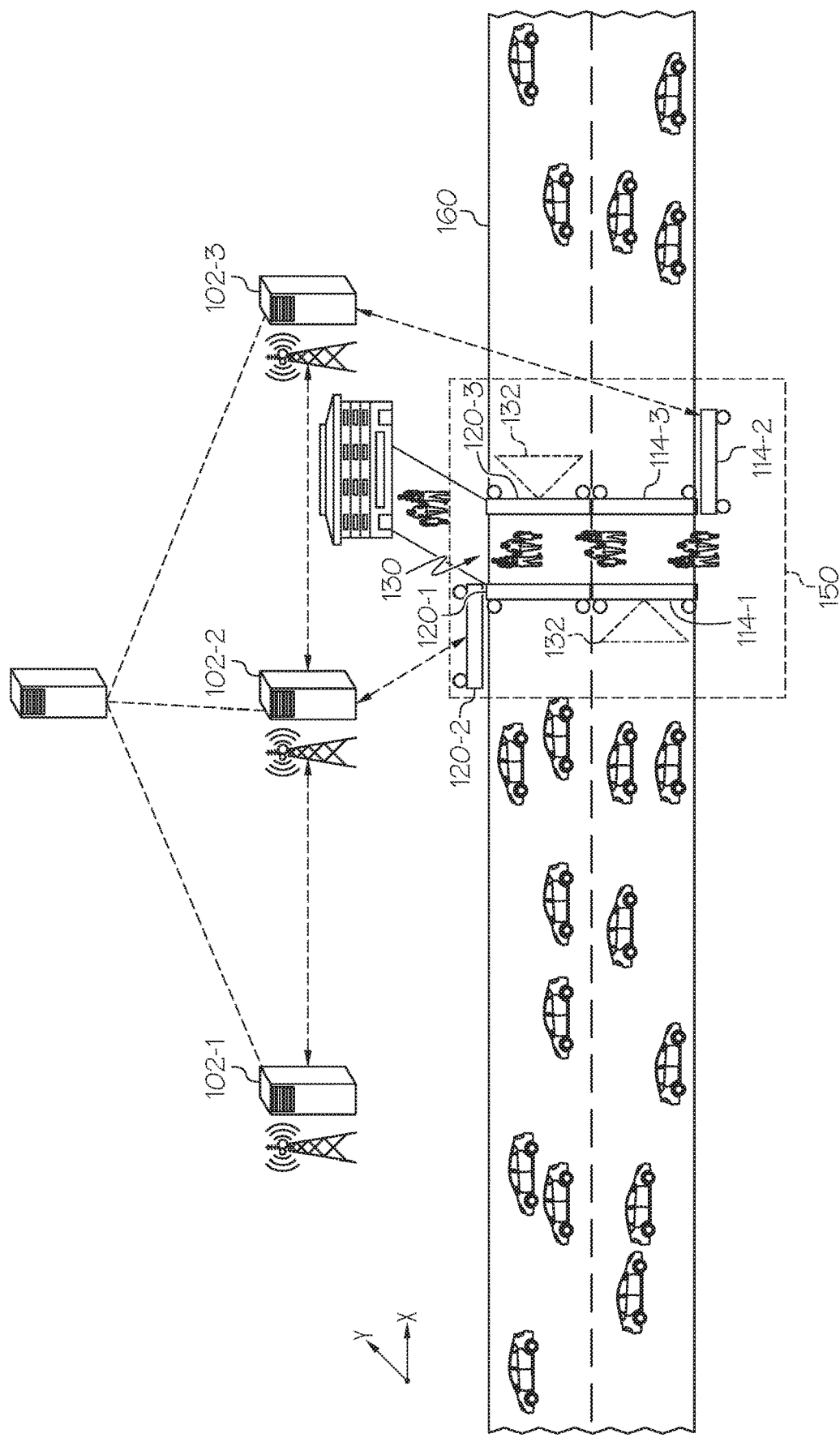
FIG. 1C schematically depicts a system for operating a structure installed at a desired location, according to one or more embodiments shown and described herein.

FIG. 1C schematically depicts a system for operating a structure installed at a desired location, according to one or more embodiments shown and described herein.

In embodiments, the remote server 140 or one or more of the servers 102-1, 102-2, 102-3 may instruct moveable objects to morph to form the structure when the moveable objects arrive at the location where the structured is to be installed. For example, the server 102-2 may instruct the compound moveable object 120 to morph to form a part of the structure 150. Specifically, the compound moveable object 120 may rotate counterclockwise when it arrives at the location such that the moveable elements 120-1 and 120-3 block the road 160 as shown in FIG. 1C. Similarly, the server 102-3 may instruct the compound moveable object 114 to morph to form another part of the structure 150. Specifically, the compound moveable object 114 may rotate counterclockwise when it arrives at the location such that the moveable elements 114-1 and 114-3 block the road 160 as shown in FIG. 1C. In some embodiments, people at the location may manually morph the moveable objects to form the structure.

In embodiments, the server 102-2 may instruct the moveable element 120-2 to move in the −x direction to open a passage 130 such that people on the sidewalk may cross the street 160 along the passage 130 without having to looking around for any approaching vehicles. Similarly, the server 102-3 may instruct the moveable element 114-2 to move in the +x direction to open the passage 130 such that people on the sidewalk may cross the street 160 along the passage 130 without having to looking around for any approaching vehicles.

In embodiments, one or more of the moveable objects may include one or more lighting devices. The lighting devices may be positioned on the exterior of the moveable objects, e.g., on the sidewalls of the moveable objects. The lighting devices may operate as temporary traffic lights. For example, when the structure 150 is installed to block the road 160, the moveable element 114-1 and the moveable element 120-3 may turn on the lighting devices 132, e.g., output red lights to let vehicles approaching the structure 150 to stop.

In embodiments, the server 104 may share information on which road segments are restricted with traffic due to installed structures. For example, the remote server 104 may share information about the location of the structure 150 with a navigation map provider via the internet such that other vehicles may be informed of the traffic restriction due to the structure 150 installed in real time. In some embodiments, vehicles nearby the structure 150 may be informed by visual indications, e.g., lighting devices on outer walls of the moveable objects, broadcasting beacons, or any wireless communications to vehicles. The vehicles may communicate the information about the location of the structure to other vehicles using wireless communication such as V2V communication.

Figure 2:
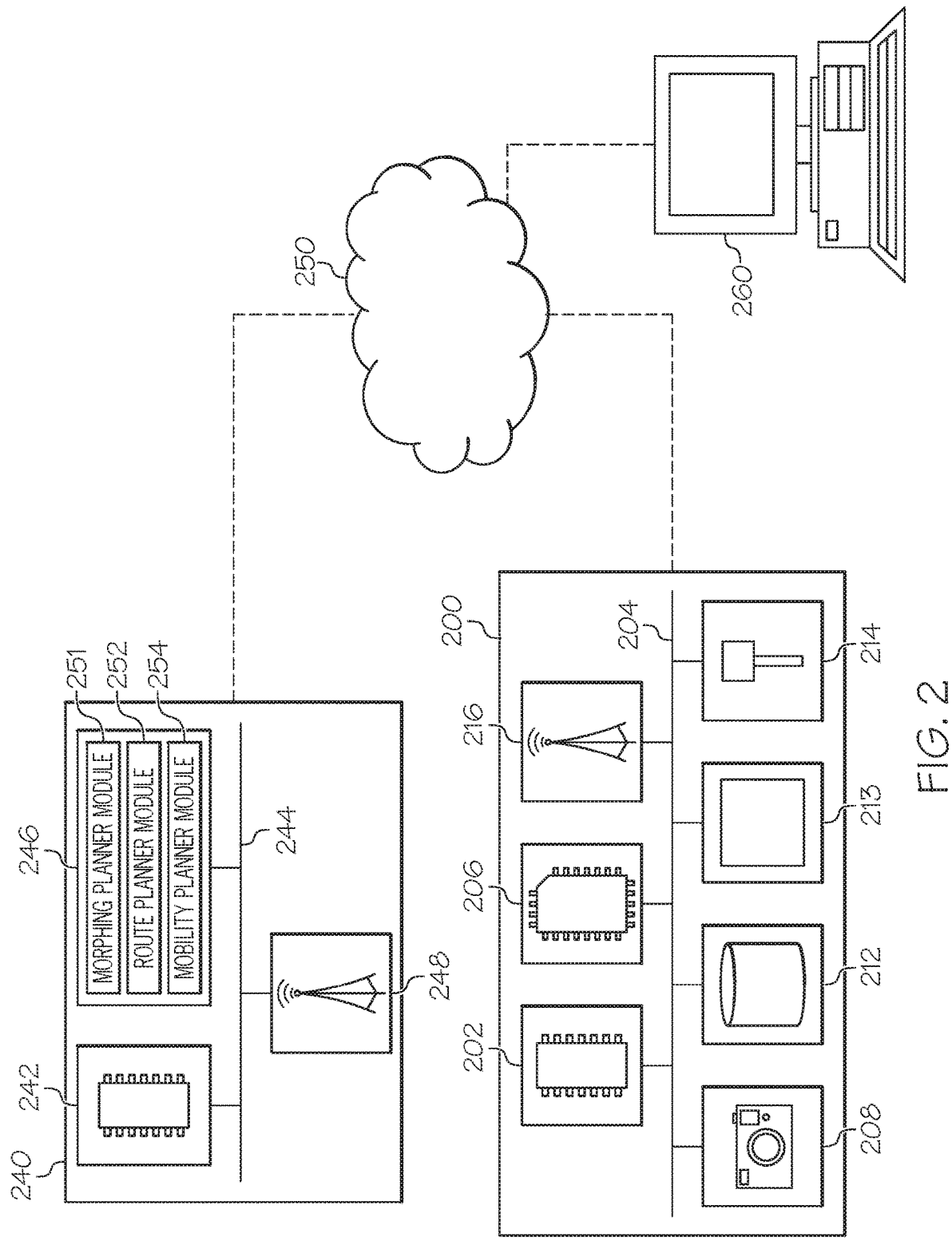
FIG. 2 schematically depicts a system for installing a structure, according to one or more embodiments shown and described herein.

FIG. 2 schematically depicts a system for installing a structure, according to one or more embodiments shown and described herein. The system for installing a structure includes a moveable object system 200, a server 240, and a computing device 260.

It is noted that, while the moveable object system 200 is depicted in isolation, the moveable object system 200 may be included within a vehicle in some embodiments, for example, within each of the moveable objects 110, 112, 114, 120, 122, 124 of FIG. 1A. In embodiments in which the moveable object system 200 is included within a vehicle, the vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input.

The moveable object system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The moveable object system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the moveable object system 200 comprises one or more sensors 208. The one or more sensors 208 may be any device having an array of sensing devices capable of detecting radiation in an ultraviolet wavelength band, a visible light wavelength band, or an infrared wavelength band. The one or more sensors 208 may be imaging sensors having any resolution. In some embodiments, one or more optical components, such as a mirror, fish-eye lens, or any other type of lens may be optically coupled to the one or more sensors 208. In embodiments described herein, the one or more sensors 208 may provide navigation support. That is, data captured by the one or more sensors 208 may be used to autonomously or semi-autonomously navigate the moveable object.

The moveable object system 200 comprises one or more vehicle sensors 212. Each of the one or more vehicle sensors 212 is coupled to the communication path 204 and communicatively coupled to the one or more processors 202. The one or more vehicle sensors 212 may include one or more motion sensors for detecting and measuring motion and changes in motion of the vehicle. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle.

The moveable object system 200 comprises a screen 213 for providing visual output such as, for example, traffic lights, advertisements and the like. The screen 213 may be positioned on the exterior of a moveable object such that other drivers or people outside the moveable object may easily see the screen 213. For example, the screen 213 may be positioned on the exterior sidewall of a moveable object.

The screen 213 is coupled to the communication path 204. Accordingly, the communication path 204 communicatively couples the screen 213 to other modules of the moveable object system 200 including, without limitation, the one or more processors 202 and/or the one or more memory modules 206. The screen 213 may include any medium capable of transmitting an optical output such as, for example, a cathode ray tube, a light emitting diode (LED) display, an organic light emitting diode (OLED) display, a liquid crystal display, a plasma display, or the like. In embodiments, the screen 213 may be a touchscreen that, in addition to visually displaying information, detects the presence and location of a tactile input upon a surface of or adjacent to the screen 213. Accordingly, each display may receive mechanical (e.g., touch) input directly upon the optical output provided by the screen. Additionally, it is noted that the screen 213 can include at least one of the one or more processors 202 and at least one of the one or more memory modules 206.

The moveable object system 200 comprises a satellite antenna 214 coupled to the communication path 204 such that the communication path 204 communicatively couples the satellite antenna 214 to other modules of the moveable object system 200. The satellite antenna 214 is configured to receive signals from global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

Still referring to FIG. 2, the moveable object system 200 comprises network interface hardware 216 for communicatively coupling the moveable object system 200 to the server 240. The network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the network interface hardware 216 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol. The network interface hardware 216 of the moveable object system 200 may transmit its data to the server 240. For example, the network interface hardware 216 of the moveable object system 200 may transmit vehicle data, location data, and the like to other vehicles or the server 240.

The moveable object system 200 may connect with one or more external vehicles and/or external processing devices (e.g., the server 240) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect (e.g., the network 250), which may be in lieu of, or in addition to, a direct connection (such as V2V or V2X) between the vehicles or between a vehicle and an infrastructure. By way of non-limiting example, vehicles may function as infrastructure nodes to form a mesh network and connect dynamically on an ad-hoc basis. In this way, vehicles may enter and/or leave the network at will, such that the mesh network may self-organize and self-modify over time. Other non-limiting network examples include vehicles forming peer-to-peer networks with other vehicles or utilizing centralized networks that rely upon certain vehicles and/or infrastructure elements. Still other examples include networks using centralized servers and other central computing devices to store and/or relay information between vehicles.

Still referring to FIG. 2, the moveable object system 200 may be communicatively coupled to the server 240 by the network 250. In one embodiment, the network 250 may include one or more computer networks (e.g., a personal area network, a local area network, or a wide area network), cellular networks, satellite networks and/or a global positioning system and combinations thereof. Accordingly, the moveable object system 200 can be communicatively coupled to the network 250 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the server 240 may correspond to one of the servers 102-1, 102-2, 102-3 or the remote server 104. In some embodiments, the server 240 may correspond to the combination of the servers 102-1, 102-2, 102-3 and the remote server 104. The server 240 includes one or more processors 242, one or more memory modules 246, network interface hardware 248, and a communication path 244. The one or more processors 242 may be a controller, an integrated circuit, a microchip, a computer, or any other computing device. The one or more memory modules 246 may comprise RAM, ROM, flash memories, hard drives, or any device capable of storing machine readable and executable instructions such that the machine readable and executable instructions can be accessed by the one or more processors 242. The communication path 244 may be similar to the communication path 204 in some embodiments.

The one or more memory modules 246 may include a morphing planner module 251, a route planner module 252, and a mobility planner module 254. The morphing planner module 251, when executed by the one or more processors 242, may generate plans for morphing one or more moveable objects. For example, the morphing planner module 251 generates a plan for morphing the compound moveable objects 114 and 120 while the compound moveable objects 114 and 120 are moving to the location where the structure 150 is to be installed. As another example, the morphing planner module 251 generates a plan for morphing the compound moveable objects 114 and 120 after the compound moveable objects 114 and 120 arrive at the location where the structure 150 is to be installed. The server 240 may instruct the compound moveable objects 114 and 120 to morph per the generated plans.

The route planner module 252, when executed by the one or more processors 242, may generate routes for selected moveable objects. For example, by referring to FIGS. 1A through 1C, the route planner module 252 may generate routes for the compound moveable objects 114 and 120 from their current locations to the location where the structure to be installed. The mobility planner module 254, when executed by the one or more processors 242, may generate time schedules for moving selected moveable objects. For example, by referring to FIGS. 1A through 1C, the mobility planner module 254 may generate time schedules for moving the compound moveable objects 114 and 120 based on service start time and end time for the structure.

Still referring to FIG. 2, the computing device 260 may be communicatively coupled to the moveable object system 200 and the server 240 via the network 250. The computing device 260 may include, without limitation, a personal computer, a smartphone, a tablet, a personal media player, or any other electric device that includes communication functionality. A user of the computing device 260 may input a type of a structure, a desired location of the structure such as a corridor and a service time and end time for the structure. For example, a screen of the computing device 260 may display a map and the user of the computing device 260 may select a location for the structure. For example, the location can be a location where a road in front of a school is present. The service time and end time for the structure may be time for students going to the school or time for students coming home from the school, respectively. The user of the computing device 260 may also select a type of the structure.

Figure 3:
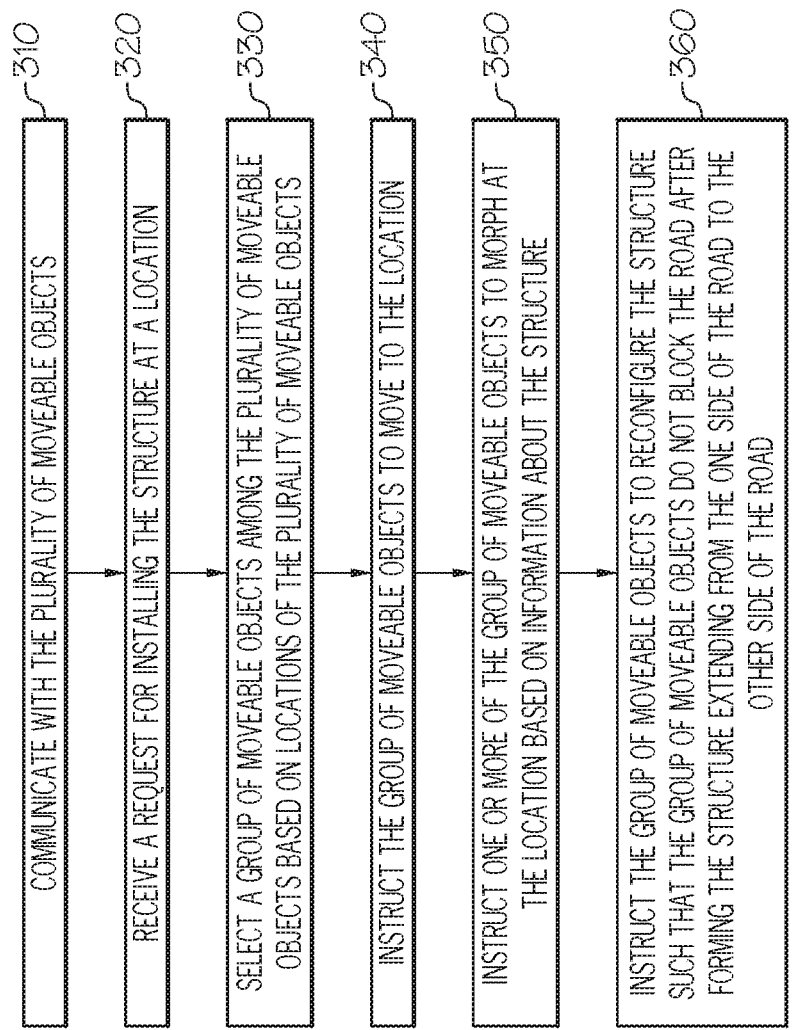
FIG. 3 depicts a flowchart for installing a structure at a desired location, according to one or more embodiments shown and described herein.

FIG. 3 depicts a flowchart for installing a structure at a desired location, according to one or more embodiments shown and described herein.

In step 310, a server may communicate with a plurality of moveable objects. In embodiments, by referring to FIGS. 1A and 2, the server 240 such as remote server 104 or the combination of the servers 102-1, 102-2, 102-3 may communicate with a plurality of moveable objects including 110, 112, 114, 120, 122, 124.

Referring back to FIG. 3, in step 320, the server may receive a request for installing a structure at a location. In embodiments, the server may receive a location of the structure, a type of the structure, and a service start and/or end time. In embodiments, by referring to FIG. 2, the user of the computing device 260 may input information about a structure, including the location of the structure, the type of the structure, a service start and/or end time via an input device (e.g., a keyboard, a mouse, a touch screen and the like). For example, the location of the structure may be a school zone, the type of the structure may be a corridor for pedestrians to pass, and the service start and end time may be 3:30 pm and 4:00 pm, respectively. As another example, the location of the structure may be a construction zone, the type of the structure may be a corridor for vehicles to pass, and the service start and end time may be 8:00 am and 8:30 am, respectively. The computing device 260 may transmit the received information about the structure to the server 240.

Referring back to FIG. 3, in step 330, the server may select a group of moveable objects among the plurality of moveable objects based on locations of the plurality of moveable objects. In embodiments, the server may select a group of moveable objects that are available and close to the location where the structure is to be installed. For example, by referring to FIG. 1B, the moveable objects 114 and 120 are selected based on their locations and the location where the structure is to be installed. In some embodiments, the server may determine the number of moveable objects that are required to install the structure based on information about the structure. For example, a corridor for crossing the road 160 may require six moveable elements. Then, the server may select a group of moveable objects that include six moveable elements. In this example, the server may select the compound moveable objects 114 and 120 each of which includes three moveable elements.

Referring back to FIG. 3, in step 340, the server may instruct the group of moveable objects to move to the location. In embodiments, by referring to FIGS. 1B and 2, the server 240 may instruct the compound moveable objects 114 and 120 to move to the location where the structure 150 is to be installed. The server 240 may instruct the compound moveable objects 114 and 120 to follow routes determined by the route planner module 252. The server 240 may instruct the compound moveable object 114 and the compound moveable object 120 to meet at the location where the structure 150 is to be installed.

Referring back to FIG. 3, in step 350, the server may instruct one or more of the group of moveable objects to morph at the location based on information about the structure. For example, by referring to FIGS. 1B, 1C, and 2, the server 240 may instruct the compound moveable object 120 to morph to form a part of the structure 150. Specifically, the compound moveable object 120 may rotate counterclockwise when it arrives at the location such that the moveable elements 120-1 and 120-3 block the road 160. Similarly, the server 102-3 may instruct the compound moveable object 114 to morph to form another part of the structure 150. Specifically, the compound moveable object 114 may rotate counterclockwise when it arrives at the location such that the moveable elements 114-1 and 114-3 block the road 160. In some embodiments, people at the location may manually morph the moveable objects 114 and 120 to form the structure 150.

Referring back to FIG. 3, in step 360, the server may instruct the group of moveable objects to reconfigure the structure such that the group of moveable objects do not block the road after forming the structure extending from one side of the road to the other side of the road. In embodiments, the server 102-2 and the server 102-3 may reconfigure the structure 150 in FIG. 1C. For example, the server 102-2 may instruct the compound moveable object 120 to move in the +y direction and the server 102-3 may instruct the compound moveable object 120 to move in the -y direction. In this regard, the structure 150 does not block the road 160 and the vehicles on the road 160 may pass by.

Figure 4:
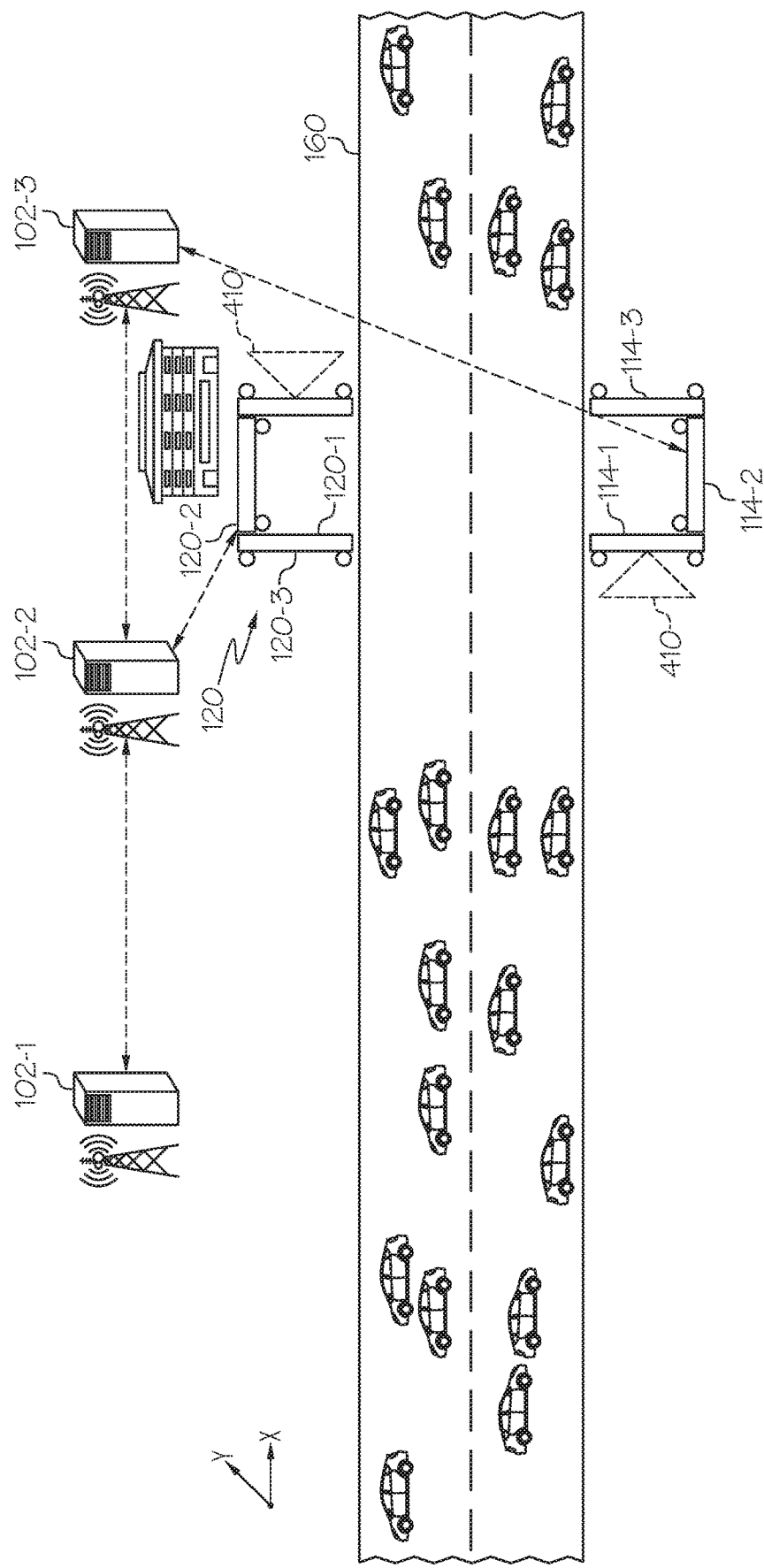
FIG. 4 depicts a divided structure that allows vehicles to pass, according to one or more embodiments shown and described herein.

In embodiments, each of the moveable elements 120-1, 120-3, 114-1, 114-3 in FIG. 1C may have sensors for detecting objects within the passage 130, for example, one or more sensors 208 in FIG. 2. If the sensors do not detect any objects within the passage 130 (i.e., there is no pedestrians within the passage 130), the moveable element 120-2 moves in the +x direction to close the passage 130 in order to prevent pedestrians from entering the passage 130 and the compound moveable object 120 moves in the +y direction to get out of the road 160 as shown in FIG. 4. Similarly, if the sensors do not detect any objects within the passage 130 (i.e., there is no pedestrians within the passage 130), the moveable element 114-2 moves in the -x direction to close the passage 130 in order to prevent pedestrians from entering the passage 130 and the compound moveable object 114 moves in the -y direction to get out of the road 160 as shown in FIG. 4.

In some embodiments, each of the moveable elements 120-1, 120-3, 114-1, 114-3 may transmit data collected from the sensors for detecting objects within the passage 130 to corresponding servers, e.g., the servers 102-2 and 102-3, respectively. Then, the server 102-2 may instruct the moveable element 120-2 to move in the +x direction to close the passage 130 and instruct the compound moveable object 120 to move in the +y direction to get out of the road 160 as shown in FIG. 4. Similarly, the server 102-3 may instruct the moveable element 114-2 to move in the -x direction to close the passage 130 and instruct the compound moveable object 114 to move in the -y direction to get out of the road 160 as shown in FIG. 4.

In embodiments, one or more of the moveable elements may include one or more lighting devices. When the compound moveable objects 114 and 120 move out of the road 160, the moveable element 114-1 and the moveable element 120-3 may turn on the lighting devices 132, e.g., output green lights to let vehicles pass by the divided structure as illustrated in FIG. 4.

Figure 5:
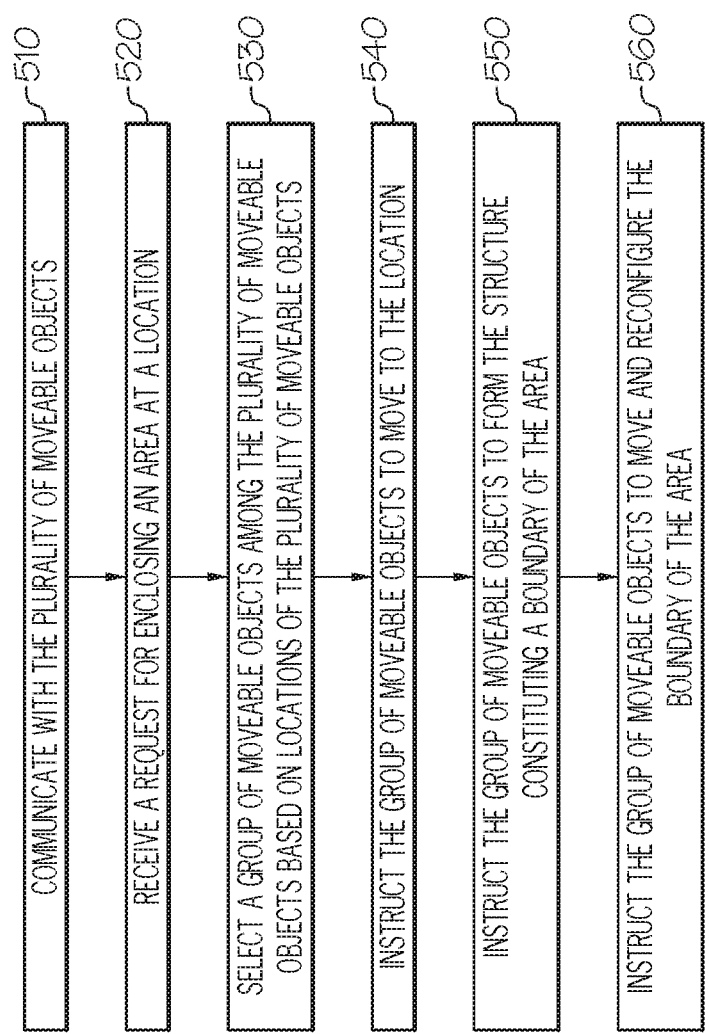
FIG. 5 depicts a flowchart for installing a structure at a desired location, according to one or more embodiments shown and described herein.

FIG. 5 depicts a flowchart for installing a structure at a desired location, according to one or more embodiments shown and described herein.

In step 510, a server may communicate with a plurality of moveable objects. In embodiments, the server 240 such as remote server 104 or the combination of the servers 102-1, 102-2, 102-3 may communicate with a plurality of moveable objects.

In step 520, the server may receive a request for enclosing an area at a location. In embodiments, the server may receive a location of the area, a size of the area, a service start and/or end time, and the like. In embodiments, the user of the computing device 260 may input information about the enclosed area including the location of the area, the size of the area, the service start and/or end time via an input device (e.g., a keyboard, a mouse, a touch screen and the like). For example, the location of the area may be a recreational zone for a festival, a concert, etc. The size of the area may be determined based on the number of people coming to the area. The service start and end time may be 8:00 pm and 10:00 pm, respectively. The computing device 260 may transmit the received information about the area to the server 240.

In step 530, the server may select a group of moveable objects among the plurality of moveable objects based on locations of the plurality of moveable objects. In embodiments, the server may select a group of moveable objects that are available and close to the location.

In step 540, the server may instruct the group of moveable objects to move to the location. In embodiments, by referring to FIG. 6A, the server 240 may instruct the moveable objects 610, 612, 614, 616, 620, 622, 624, 626 to move to the location where the area 630 is to be enclosed.

Referring back to FIG. 5, in step 550, the server may instruct the group of moveable objects to form a structure constituting the boundary of the area. In embodiments, by referring to FIG. 6A, the server 102-2 may instruct the moveable objects 610, 612, 614, 616 to form a part of the boundary of the area 630 and the server 102-3 may instruct the moveable objects 620, 622, 624, 626 to form other part of the boundary of the area 630 such that people inside the area 630 may enjoy entertainment without worrying about moving vehicles nearby. As described above, one or more of the moveable objects 610, 612, 614, 616, 620, 622, 624, 626 may include lights that may operate as traffic lights to control movements of vehicles approaching the area 630.

Referring back to FIG. 5, in step 560, the server may instruct the group of moveable objects to move and reconfigure the boundary of the area. In embodiments, by referring to FIG. 6B, the server 102-2 may instruct the moveable objects 610, 612, 614, 616 to reconfigure to form a part of a boundary for a smaller area 640 and the server 102-3 may instruct the moveable objects 620, 622, 624, 626 to reconfigure to form other part of the boundary of the smaller area 640 such that the moveable objects take less space of the roads 602 and 604.

Figure 6A:
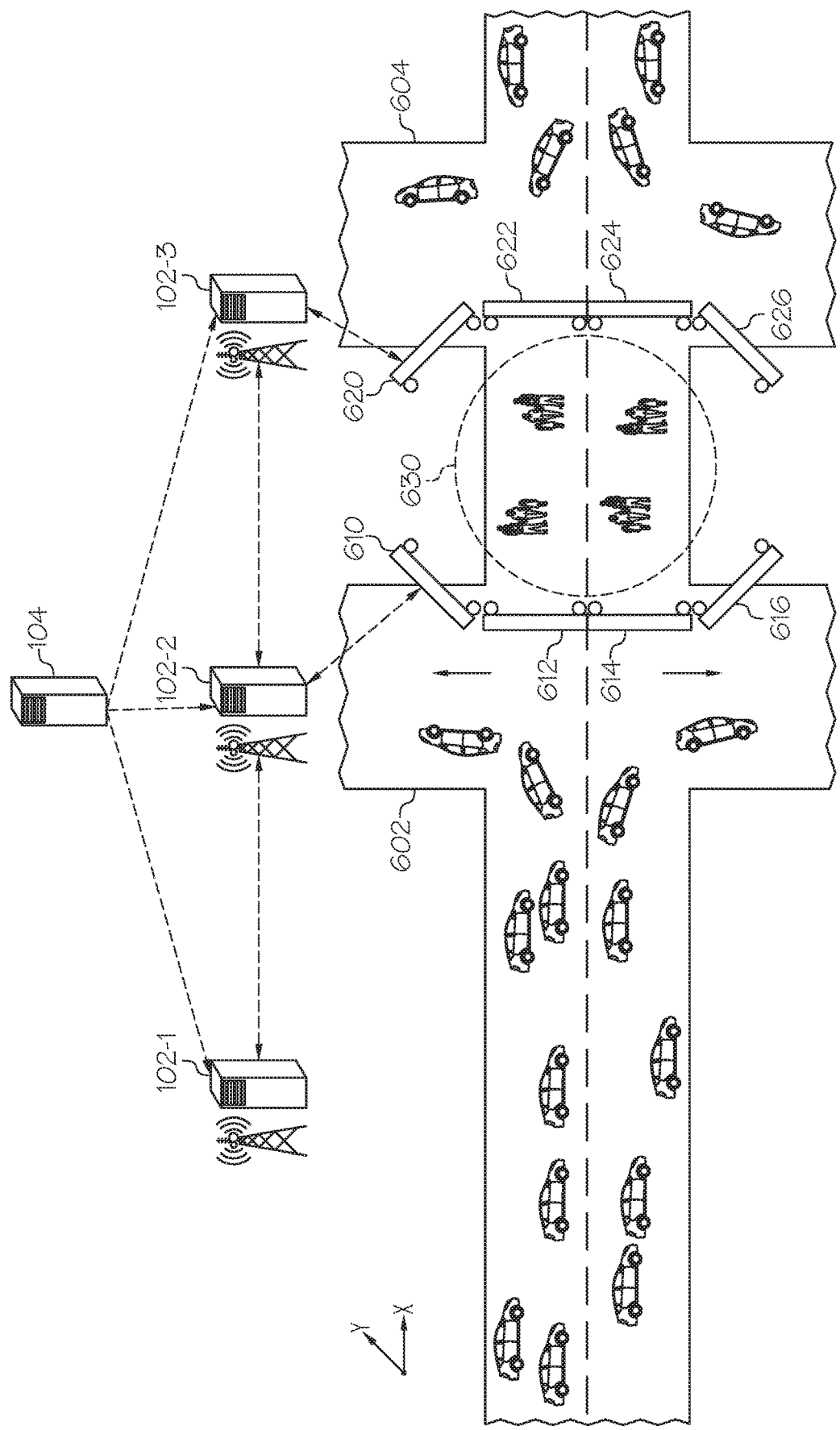
FIG. 6A depicts a system for installing a structure surrounding an area, according to another embodiment shown and described herein.
Figure 6B:
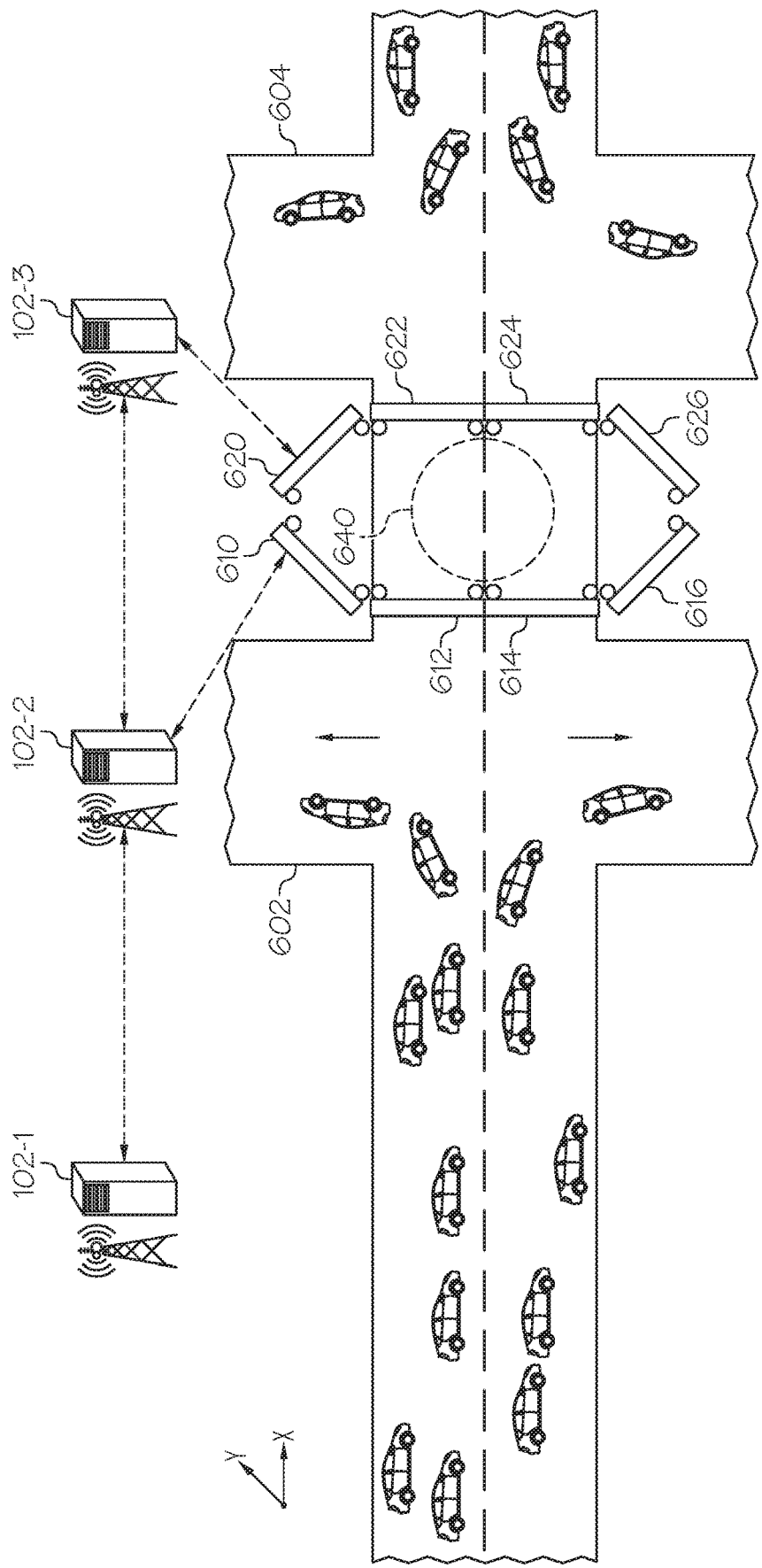
FIG. 6B depicts a system for installing a structure surrounding a reduced area, according to another embodiment shown and described herein.

In embodiments, one or more of the moveable objects 610, 612, 614, 616, 620, 622, 624, 626 in FIG. 6A may have sensors for detecting objects within the area 630, for example, one or more sensors 208 in FIG. 2. One or more of the moveable objects 610, 612, 614, 616, 620, 622, 624, 626 in FIG. 6A may take an image of the area 630 and transmit the image to the server 102-2 and/or the server 102-3. The server 102-2 and/or the server 102-3 may process the image to determine population density in the area 630. In some embodiments, the server 104 instead of the server 102-2 and server 102-3 may process the image to determine population density. If the population density in the area 630 is less than a lower limit, then the server 102-2 and the server 102-3 may instruct the moveable objects to reconfigure to form a boundary of a smaller area, e.g., the area 640. Similarly, if the population density in the area 630 is greater than an upper limit, then the server 102-2 and the server 102-3 may instruct the moveable objects to reconfigure to form a boundary of a greater area. In some embodiments, if the sensors do not detect any objects within the area 630 (i.e., there is no people within the area 630), the moveable objects 610, 612, 614, 616, 620, 622, 624, 626 may leave the location such that the area 630 is not surrounded by moveable objects anymore. In some embodiments, when the service time for the structure ends, the server 102-2 and the server 102-3 may instruct the moveable objects 610, 612, 614, 616, 620, 622, 624, 626 to leave the area 630.

In some embodiments, the moveable objects 610, 612, 614, 616, 620, 622, 624, 626 may have sensors for detecting objects outside the area 630. For example, the moveable objects 610, 612, 614, 616, 620, 622, 624, 626 may have sensors for detecting vehicles on the roads 602 and 604. One or more of the moveable objects 610, 612, 614, 616, 620, 622, 624, 626 in FIG. 6A may take images of the roads 602 and 604 and transmit the images to the server 102-2 and the server 102-3. The server 102-2 and the server 102-3 may process the image to determine a degree of traffic congestion on the roads 602 and 604. In some embodiments, the server 104 may process the images to determine the degree of traffic congestion. If the degree of traffic congestion is less than a lower limit, then the server 102-2 and the server 102-3 may instruct the moveable objects to reconfigure to form a boundary of a larger area. Similarly, if the degree of the traffic congestion is greater than an upper limit, then the server 102-2 and the server 102-3 may instruct the moveable objects to reconfigure to form a boundary of a smaller area, e.g., the area 640 in order to reduce traffic congestion on the roads 602 and 604.

Figure 7:
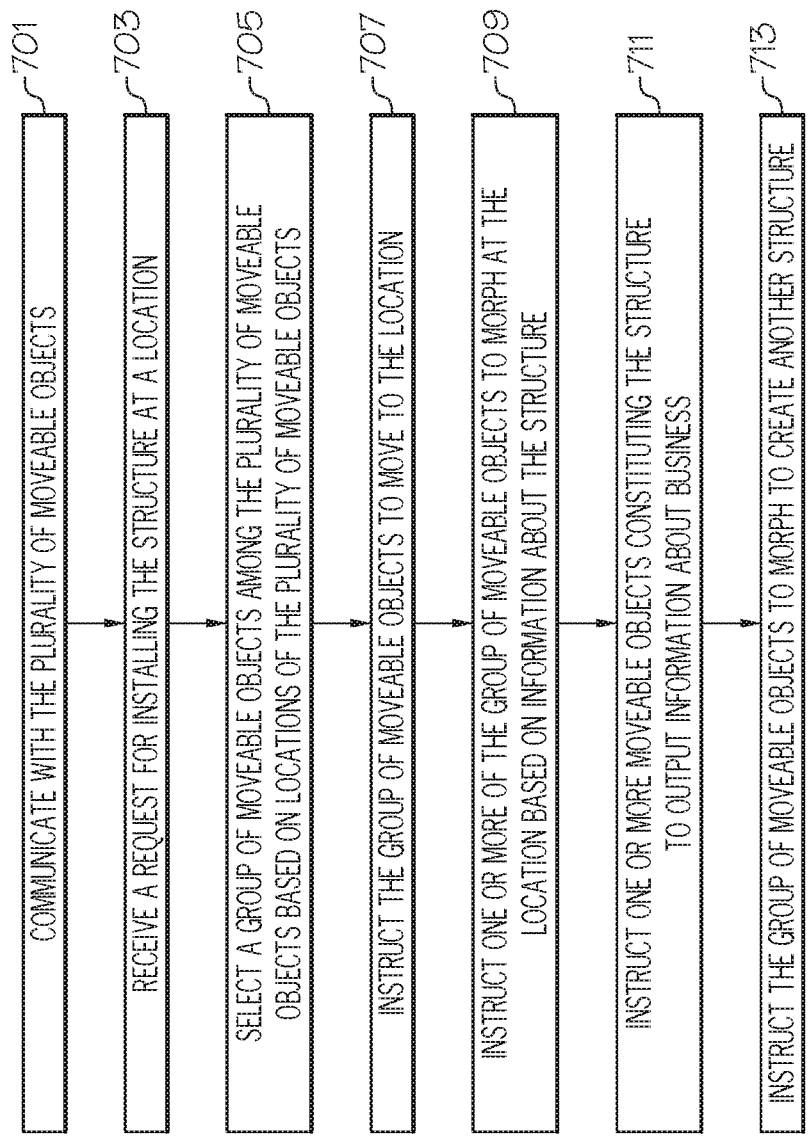
FIG. 7 depicts a flow chart for installing a structure according to another embodiment shown and described herein.
Figure 7A:
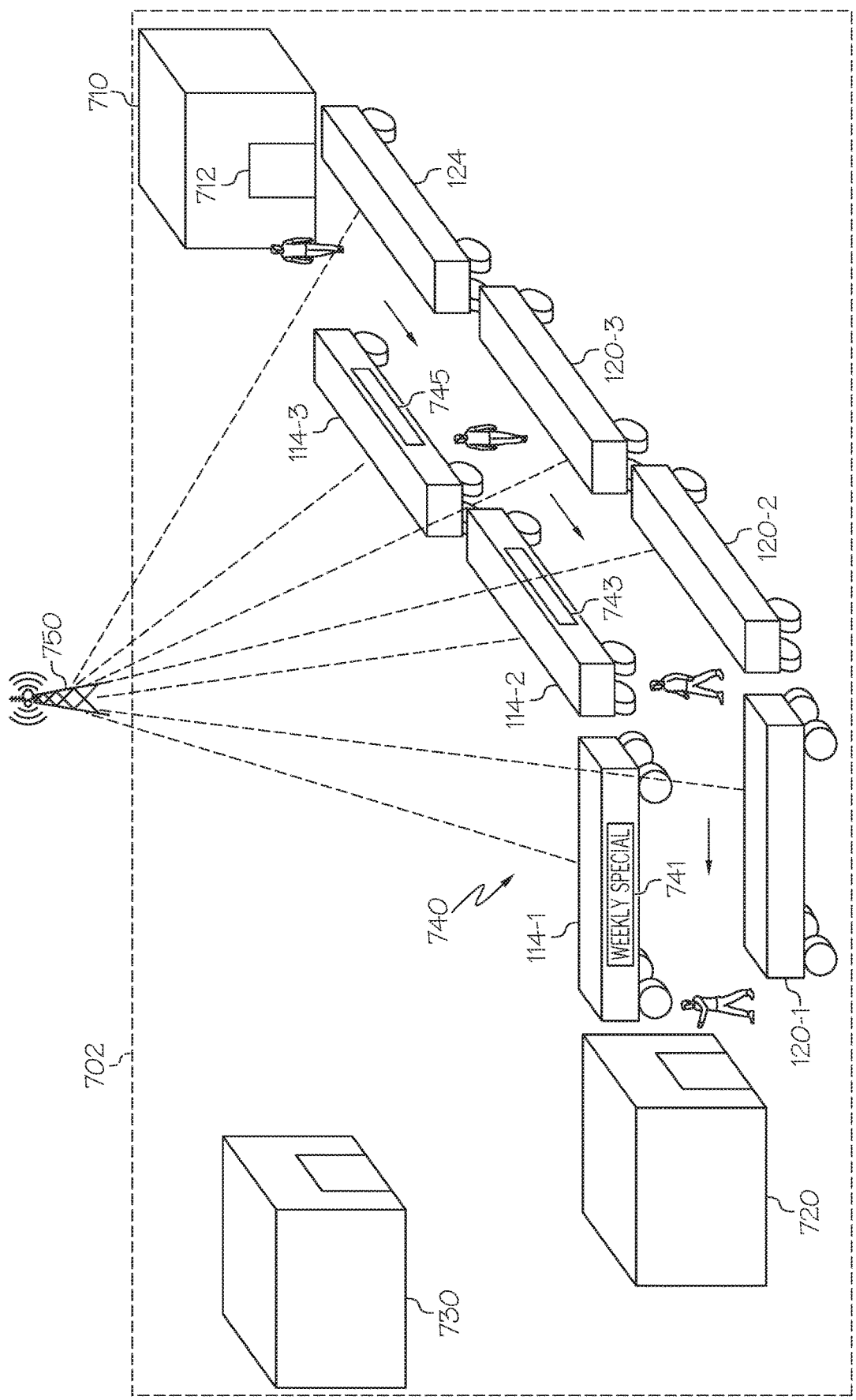
FIG. 7A depicts a system for installing a structure extending from a building to another building, according to another embodiment shown and described herein.

FIG. 7 depicts a flow chart for installing a structure according to another embodiment shown and described herein. The structure 740 may be a corridor extending from a building 710 to a building 720 illustrated in FIG. 7A. Each of the building 710 and 720 may be a traditional brick-and-mortar store such as a shopping mall, a small retail shop, a convention center, or an outdoor pop-up store such as a farmer's market, a flea market, and the like. In some embodiments, the structure 740 may be extended from the building 710 to a parking lot across a street.

In step 701, a server may communicate with a plurality of moveable objects. In embodiments, by referring to FIGS. 1A and 2, the server 240 such as the remote server 104 or the combination of the servers 102-1, 102-2, 102-3 may communicate with a plurality of moveable objects including 110, 112, 114, 120, 122, 124.

Referring back to FIG. 7, in step 703, the server may receive a request for installing a structure at a location. In embodiments, a remote server such as the remote server 104 in FIG. 1A receives a request for installing a structure in an area. The server may receive a location of the structure, a type of the structure, a service start and/or end time. In embodiments, by referring to FIG. 2, the user of the computing device 260 may input information about a structure including the location of the structure, the type of the structure, the service start and/or end time via an input device (e.g., a keyboard, a mouse, a touch screen and the like). For example, the location of the structure may be within the area 702 for the building 710, the type of the structure may be a corridor for customers to pass, and the service start and end time may be 10:00 am and 4:00 pm, respectively. The area 702 may be a parking lot for the building 710 or any other land related to the building 710. The computing device 260 may transmit the received information about the structure to the server 240.

Referring back to FIG. 7, in step 705, the server may select a group of moveable objects among the plurality of moveable objects based on locations of the plurality of moveable objects. In embodiments, the server 240 may select a group of moveable objects that are available and close to the area 702. For example, by referring to FIG. 1B, the moveable objects 114, 120 and 124 are selected based on their locations and the location where the structure is to be installed. In some embodiments, the server 240 may determine the number of moveable objects that are required to install the structure based on information about the structure. For example, a corridor extending from the building 710 to a building 720 illustrated in FIG. 7A may require seven moveable elements. Then, the server 240 may select a group of moveable objects that include seven moveable elements. In this example, the server 240 may select the compound moveable objects 114 and 120 each of which includes three moveable elements and the moveable object 124 which includes a single moveable element.

Referring back to FIG. 7, in step 707, the server may instruct the group of moveable objects to the location. In embodiments, by referring to FIG. 7A, the server 240 may instruct the group of moveable objects to move to the area 702. The server 240 may instruct the moveable objects 114, 120, and 124 to meet in the area 702 where the structure 740 is to be installed.

Referring back to FIG. 7, in step 709, the server may instruct one or more of the group of moveable objects to morph at the location based on information about the structure. For example, by referring to FIG. 7A, the server 750 which is a local server such as an edge server, a road side unit, and the like may instruct the compound moveable object 114 to morph to form a part of the structure 740. Similarly, the server 750 may instruct the compound moveable object 120 to morph to form another part of the structure 740. The server 750 may instruct the moveable object 124 to move to form the rest part of the structure 740.

Referring back to FIG. 7, in step 711, the server may instruct one or more moveable objects constituting the structure to output information about business. In embodiments, one or more of the moveable objects or moveable elements may include screens. For example, each of the moveable elements 114-1, 114-2, 114-3 may include screens 741, 743, 745, respectively. Each of the screens 741, 743, 745 may correspond to the screen 213 in FIG. 2. The screens 741, 743, 745 may output information about the business of the building 720. Specifically, the information about the business of the building 720 may be transmitted to the server 750, and the server 750 may transmit the information to the moveable elements 114-1, 114-2, 114-3 such that customers walking toward the building 720 may see advertisements for the business in the building 720. In some embodiments, the information about the business of the building 720 may be transmitted to the moveable elements 114-1, 114-2, 114-3 via V2X communication.

Figure 7B:
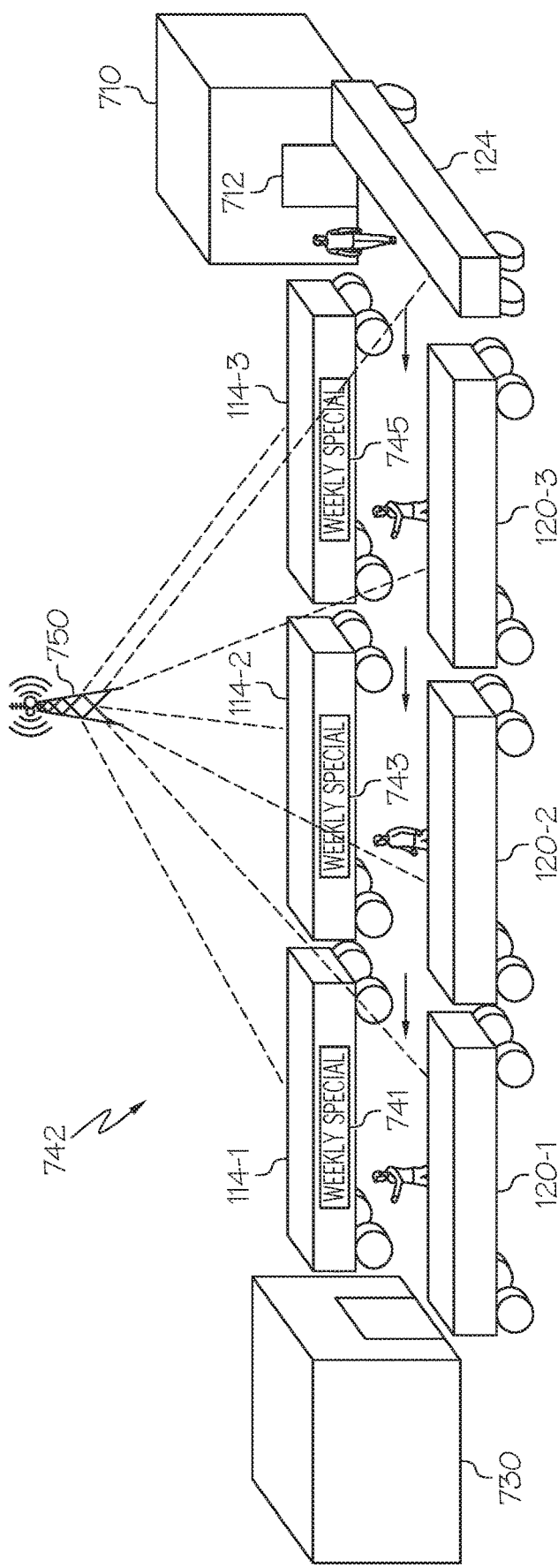
FIG. 7B depicts a system for installing a structure extending from a building to another building, according to another embodiment shown and described herein.

Referring back to FIG. 7, in step 713, the server may instruct the group of moveable objects to morph to create another structure. By referring to FIGS. 7A and 7B, in embodiments, the server 750 may instruct the moveable elements 114-1, 114-2, 114-3, the moveable elements 120-1, 120-2, 120-3, and the moveable object 124 to morph to form the structure 742. The structure 742 may be a corridor extending from the building 710 to the building 730. In embodiments, the server 750 may instruct the moveable elements 114-1, 114-2, 114-3, the moveable elements 120-1, 120-2, 120-3, and the moveable object 124 to morph to form the structure 742 based on a service start time and end time for the business in the building 720 and the business in the building 730. For example, the store hours for the building 720 may be 8 am to 2 pm, and the store hours for the building 730 may be 4 pm to 10 pm. The server 750 may instruct the moveable elements 114-1, 114-2, 114-3, the moveable elements 120-1, 120-2, 120-3, and the moveable object 124 to morph to form the structure 742 after 2 pm. After 10 pm, the server 750 may instruct the moveable elements 114-1, 114-2, 114-3, the moveable elements 120-1, 120-2, 120-3, and the moveable object 124 to morph to return to the structure 740. As another example, the building 720 is open on weekdays and the building 730 is open during the weekend. The server 750 may instruct the moveable elements 114-1, 114-2, 114-3, the moveable elements 120-1, 120-2, 120-3, and the moveable object 124 to morph to form the structure 742 on Friday night. On Sunday night, the server 750 may instruct the moveable elements 114-1, 114-2, 114-3, the moveable elements 120-1, 120-2, 120-3, and the moveable object 124 to morph to return to the structure 740.

Figure 8:
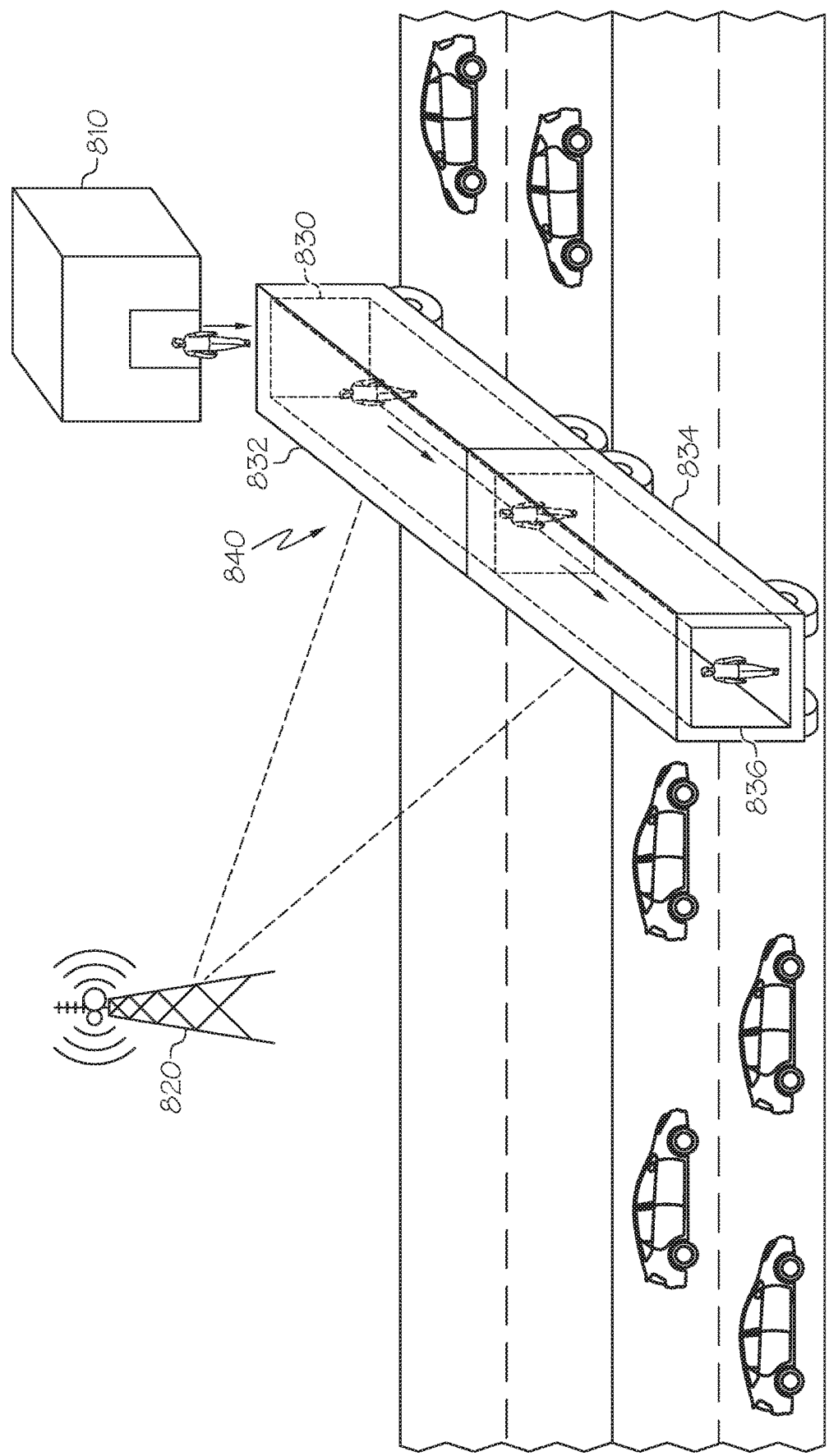
FIG. 8 depicts installing a structure according to another embodiment shown and described herewith.

FIG. 8 depicts installing a structure according to another embodiment shown and described herewith. In embodiments, a server 820 may select two moveable objects 832 and 834 and instruct the moveable objects 832 and 834 to constitute a structure 840. The structure 840 may extend from one side of a road to the other side of the road. The structure 840 may include two entrances 830 and 836 on each side of the structure 840 such that people from a building 810 can cross the street by passing through the entrance of the structure 840. As described above, the moveable objects 832 and 834 may include lights that may operate as traffic lights to control movements of vehicles approaching the structure 840.

According to the present disclosure, provided are systems and methods for installing a structure using a plurality of moveable objects on an on-demand basis. The present system includes a plurality of moveable objects and a server including a controller. The controller may communicate with the plurality of moveable objects, receive a request for installing the structure at a location, select a group of moveable objects among the plurality of moveable objects based on locations of the plurality of moveable objects, instruct the group of moveable objects to move to the location, and instruct one or more of the group of moveable objects to morph at the location based on information about the structure to form the structure.

Each of the moveable objects may be an autonomous entity that creates flexible and intelligent spaces and high-quality experiences to eliminate barriers to the growth of communities and businesses of tomorrow. The present system provides remote and manual control through a management console and has data and traffic driven intelligence for curating the best locations. The present system has dynamic morphing maneuver capability to form a demanded structure on roads. According to the present disclosure, a structure such as a humanitarian corridor may be installed on an on-demand basis. In contrast with conventional humanitarian corridors, according to the present disclosure, wherever or whenever a structure is requested, the location, corridor type and service start or end time are uploaded to the system. The present system may utilize this information to build the requested structure at the requested location at the right timing. In addition, the structure may be dynamically changed based on various factors such as traffic on roads, service time for the structure, and the like.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for installing a structure, the system comprising:
   a server comprising:
      a controller programmed to:
         communicate with a plurality of vehicles;
         receive a request for installing the structure at a location;
         select a group of vehicles among the plurality of vehicles based on locations of the plurality of vehicles;
         instruct the group of vehicles to move to the location; and
         instruct one or more of the group of vehicles to morph at the location to form a corridor extending from one side of a road to an other side of the road based on information about the structure.

2. The system of claim 1, wherein the group of vehicles includes a compound vehicle including a plurality of moveable elements; and
   the controller is programmed to instruct the compound vehicle to morph by rearranging the plurality of moveable elements based on information about the structure.

3. The system of claim 1, wherein each of the plurality of vehicles is an autonomous driving vehicle.

4. The system of claim 1, wherein the controller is programmed to:
receive timing information for the structure;
select the group of vehicles among the plurality of vehicles based on information about a type of the structure or a dimension of the structure; and
instruct the group of vehicles to move to the location based on the timing information for the structure.

5. The system of claim 1, wherein the controller is programmed to:
instruct the group of vehicles to form the structure at the location; and
instruct additional vehicles to output alerts to vehicles coming toward the location.

6. The system of claim 5, wherein:
one or more of the group of vehicles include one or more lighting devices; and
the one or more lighting devices turn on while the group of vehicles form the corridor.

7. The system of claim 5, wherein:
the controller is programmed to:
instruct the group of vehicles to reconfigure the corridor such that the group of vehicles do not block the road after forming the corridor extending from the one side of the road to the other side of the road.

8. The system of claim 5, wherein:
the group of vehicles include sensors for detecting objects inside the corridor.

9. The system of claim 8, wherein:
the group of vehicles determine whether an object is present inside the corridor; and
the group of vehicles reconfigure the corridor such that the group of vehicles do not block the road in response to determination that no object is present inside the corridor.

10. The system of claim 5, wherein the controller is programmed to instruct one or more of the group of vehicles to morph at a location to form a barrier surrounding a vehicle incident.

11. The system of claim 1, wherein the controller is programmed to instruct one or more of the group of vehicles to morph at a location to form a corridor extending from an entrance of a first building to an entrance of a second building.

12. The system of claim 1, wherein the controller is programmed to instruct one or more of the group of vehicles to morph at a location to form a corridor extending from an off-street area to premises of a business, and
instruct one or more vehicles constituting the corridor to output information about the business.

13. The system of claim 11, wherein the controller is programmed to:
instruct the group of vehicles to morph to create another structure,
wherein the another structure is a corridor extending from the entrance of the first building to an entrance of a third building.

14. The system of claim 13, wherein the second building and the third building are located on an area adjacent to the first building.

15. A system for installing a structure, the system comprising:
a server comprising:
a controller programmed to:
communicate with a plurality of vehicles;
receive a request for enclosing an area at a location;
select a group of vehicles among the plurality of vehicles based on locations of the plurality of vehicles;
instruct the group of vehicles to move to the location;
instruct the group of vehicles to form the structure constituting a boundary of the area;
obtain real-time traffic information around the area; and
instruct the group of vehicles to move and reconfigure the boundary of the area based on the real-time traffic information.

16. The system of claim 15, wherein:
the group of vehicles include sensors for detecting objects in the area; and
the controller is programmed to:
instruct the group of vehicles to move and reconfigure the boundary of the area based on information about the objects in the area.

17. The system of claim 15, wherein the controller is programmed to:
receive timing information for the structure; and
instruct the group of vehicles to move to the location based on the timing information for the structure.

18. The system of claim 15, wherein one or more of the group of vehicles include devices for outputting an indication for directing vehicles outside the area.

19. The system of claim 15, wherein the controller is programmed to:
instruct a compound vehicle of the group of vehicles to morph by rearranging a plurality of moveable elements constituting the computing vehicle based on information about the structure while moving to the location.

20. The system of claim 1, wherein the controller is programmed to:
instruct a compound vehicle of the group of vehicles to morph by rearranging a plurality of moveable elements constituting the computing vehicle based on information about the structure while moving to the location.

* * * * *

UNITED STATES PATENT AND TRADEMARK OFFICE
CERTIFICATE OF CORRECTION

PATENT NO. : 11,403,940 B2
APPLICATION NO. : 16/735804
DATED : August 2, 2022
INVENTOR(S) : Seyhan Uçar, Baik Hoh and Kentaro Oguchi It is certified that error appears in the above-identified patent and that said Letters Patent is hereby corrected as shown below:

On the Title Page

In page 2, Column 2, item (56), foreign patent documents, cite no. 2, delete "GN" and insert --CN--, therefor.

Signed and Sealed this
Eighth Day of November, 2022

Katherine Kelly Vidal
*Director of the United States Patent and Trademark Office*